United States Patent [19]

Alphonsus

[11] Patent Number: 5,594,581
[45] Date of Patent: Jan. 14, 1997

[54] LOW LOSS OPTICAL TRANSMISSION/MONITORING PATH SELECTION IN REDUNDANT EQUIPMENT TERMINALS

[75] Inventor: Justin E. J. Alphonsus, Howell, N.J.

[73] Assignee: Lucent Technologies Inc., Murray Hill, N.J.

[21] Appl. No.: 547,392

[22] Filed: Oct. 24, 1995

Related U.S. Application Data

[63] Continuation of Ser. No. 175,015, Dec. 29, 1993, abandoned.

[51] Int. Cl.⁶ .......................... H04B 10/02; H04J 14/00
[52] U.S. Cl. ........................... 359/177; 359/110; 359/117
[58] Field of Search ..................... 359/110, 115, 359/117, 118, 124, 125, 128, 173, 177, 178, 179; 370/16, 16.1

[56] References Cited

U.S. PATENT DOCUMENTS

| | | | |
|---|---|---|---|
| 4,393,493 | 7/1983 | Edwards | 370/16 |
| 4,646,286 | 2/1987 | Reid et al. | 370/16 |
| 4,733,320 | 5/1988 | Ikeuchi et al. | 370/16 |
| 5,014,261 | 5/1991 | Shinbashi et al. | 359/110 |
| 5,299,293 | 5/1994 | Mestdagh et al. | 359/110 |
| 5,321,540 | 6/1994 | Takai et al. | 359/125 |
| 5,327,275 | 7/1994 | Yamano et al. | 359/117 |
| 5,335,105 | 8/1994 | Carlton | 359/135 |
| 5,343,464 | 8/1994 | Iino et al. | 370/16 |

FOREIGN PATENT DOCUMENTS 9211709  7/1992  WIPO ..................... 359/110

*Primary Examiner*—Leslie Pascal
*Assistant Examiner*—Rafael Bacares

[57] ABSTRACT

An optical line terminal of the type including sets of optical signal processing components arranged in an identical manner in mutually redundant parallel branches includes an input switch that routes an incoming optical signal for processing into either one of two branches to the exclusion of the other. Following amplification, a part of an optical signal propagating in the one branch is branched-off and routed through the same input switch into the other branch to be processed therein identically to the one branch processing for monitoring the status of the other branch. On detection of faulty processing in the one branch, the input switch is switched into its other state in which it reroutes the incoming optical signal into the other branch for processing therein, while also routing a part of the amplified optical signal from the other branch into the one branch for monitoring the one branch.

10 Claims, 2 Drawing Sheets

LOW LOSS OPTICAL
TRANSMISSION/MONITORING PATH
SELECTION IN REDUNDANT EQUIPMENT
TERMINALS

This is a continuation of application Ser. No. 08/175,015, filed Dec. 29, 1993 now abandoned.

BACKGROUND OF THE INVENTION

1. Field of the Invention

The present invention relates to optical signal transmission and processing in general and, more particularly, to operating and monitoring the performance of redundant terminal equipment, especially such adapted to be used to form interfaces between undersea lightwave transmission systems and land based optical and/or electrical telephone signal transmission systems.

2. Description of the Related Art

Optical transmission systems utilizing optical fibers as the optical signal transmission medium are already in use and are gaining in popularity, especially because of their substantial immunity to external influences or interference, their ability to transmit a great number of communication channels in the same physical medium (optical fiber) without crosstalk between such channels, the relative ease with which the information to be transmitted can be imposed (modulated) on and retrieved (demodulated) from the respective optical carrier, their amenability to operation at very high transmission rates especially when transmitting digitally encoded, optionally multiplexed and/or compressed, information, as well as other, not necessarily less important, factors that make this approach attractive.

It is well known that no matter what kind of transmission medium is being used for transmitting the information-carrying signals, losses are incurred as such signals propagate through the medium. This means that the quality of the output signal emerging from the receiving end of such medium that is located remotely from the transmitter (i.e. the amplitude, phase, waveform etc. of such signal) is lower than that of the signal launched into the medium by the transmitter, particularly when the signals are transmitted over considerable distances such as through undersea cables or the like. In some cases, the signal quality deterioration during signal propagation through the transmission medium reaches a point where it is necessary, in order to obtain the output signal quality that is required for faultless retrieval of the information contents of such signal, to interpose one or more amplifier or repeater (or, more generally, signal reconstituting) stations at strategically chosen locations along the transmission medium. This may be very difficult if not impossible to do in situations where the transmission medium is an optical cable, especially one extending through regions that are, for all intents and purposes, remote or virtually inaccessible such as the sea bottom. In such situations, the need for providing optical signal reconstituting stations along the length of the cable would at the very least complicate the construction of the cable by requiring it to include means for supplying electric power to such stations, in addition to the virtual impossibility of repairing or replacing equipment located at such inaccessible stations in the event of its failure. In any event, the number of such stations, if needed at all, should be as low as possible or feasible.

What further aggravates this situation is the existence of insertion and other losses at the transition or interface between the receiving end of the optical cable and the so-called terminal transmission equipment that receives the optical output signals from, and/or launches optical signals into, the optical waveguide of such long distance optical cable, and/or within the terminal transmission equipment itself. It will be appreciated that the more power of the transmitted optical signal that must be reserved for covering such terminal transmission equipment losses, the higher must be the power of the output signal launched into such equipment from the receiving end of the optical cable. This, in turn, means that the maximum length of an optical cable or fiber of given transmission properties that a system designer will be able to use for a given optical power launched into such fiber or cable will have to be reduced in inverse proportion to any increase in the amount of losses expected to be incurred at the terminal transmission equipment. Conversely, any attainable reduction in the amount of such terminal transmission equipment losses will make that much more optical power available for covering transmission losses in the transmission medium, thus making it possible to commensurately increase the length of the transmission medium.

This situation is further complicated by the requirements to be met, particularly in so-called protected equipment (or unprotected line, redundant equipment) applications such as those utilized in undersea lightwave transmission systems, including the ability to monitor the integrity and performance of the optical transmission system and of the various components of at least that part of the terminal transmission equipment that is disposed at the receiving end of the undersea optical transmission plant, and the ability to continue the operation of the transmission system should or when some of such components malfunction or fail. To this end, it is customary to provide the respective terminal transmission equipment with a redundant number of such components and to arrange such components in a plurality of branches (two being considered to be sufficient in most cases) that are identical to one another insofar as the arrangement and interconnections of components and the signal processing performed thereby. These branches are arranged, in effect, in parallel to one another so that each is capable of processing the optical signal entering the affected terminal transmission equipment from the transmission medium independently of any other branch to present an output signal (or a number of such output signals) to a terminal transmission equipment output (or outputs). At the same time, the other (of the usual two) branches is typically being used for monitoring purposes in that the incoming optical signal is processed therein in a manner identical to that occurring in the first-mentioned branch to produce information that can be used, in a well-known manner, to determine the health of the system. If this determination reveals that the processing taking place in the first-mentioned branch is faulty, the signal emerging from the other (i.e. originally monitoring) branch is routed to the terminal equipment output(s), pending restoration of the proper operation of the first-mentioned branch—as for example, by replacing any failed or improperly functioning component thereof.

It is a current practice to use a 50/50 optical beam splitter, especially an optical fiber coupler, at the input end of the affected terminal transmission equipment to supply the incoming optical signal to the two parallel branches for parallel processing. This approach has the drawback that the optical signal power reaching each of such branches is about 4.5 dB below that issuing from the receiver end of the optical fiber, of which about 3 dB is attributable to the fact that only (substantially) one-half of the incoming optical signal power is routed by the optical coupler to each of the parallel branches, while the remainder results from insertion and other coupler losses. This constitutes a significant reduction of the optical power available for processing in each of the parallel branches to a level that is unacceptable in many transmission systems.

OBJECTS AND SUMMARY OF THE INVENTION

Accordingly, it is a principal object of the present invention to avoid the disadvantages of the prior art.

More particularly, it is an object of the present invention to provide an optical waveguide transmission system enabling increased distance between transmission and reception points relative to currently-known systems.

It is another object of the present invention to provide terminal transmission equipment of the type including redundant components arranged in identical parallel optical signal processing branches, particularly for use in the transmission system of the above type, which does not suffer the drawbacks of such prior art equipment.

Still another object of the present invention is to minimize losses suffered by optical signals on entering terminal transmission equipment of the type under consideration herein.

A concomitant object of the invention is to construct such equipment so as to be relatively simple, inexpensive to manufacture, easy to use, and nonetheless reliable in operation.

In keeping with these objects, and others that will become apparent hereafter, one feature of the present invention resides in an optical line terminal that has a main input for receiving at least one incoming optical signal and a main output for issuing at least one outgoing optical signal. The terminal includes means for processing optical signals in a substantially identical manner in any of a plurality of mutually redundant branches that extend in parallel relation with one another between the main input and the main output. Means for joining at least one of the plural branches at a time with the main output is provided in order to direct the outgoing output signal to the main output. In accordance with the present invention, optical switching means is interposed between the main input and the plural branches of the optical signal processing means. Such optical switching means includes at least one switch input connected to the main input for receiving the incoming optical signal therefrom, a plurality of switch outputs each connected to an associated one of the branches, and means for connecting the one switch input in each switching state of the optical switching means with only one of the switch outputs of the optical switching means to direct all optical power of the incoming optical signal exclusively into the one branch. There is also provided means for controlling the operation of the optical switching means to selectively switch between its switching states.

In a particularly advantageous implementation of the invention, the switching means further includes an additional switch input and additional connecting means for connecting the additional switch input in each of the switching states with another of the switch outputs that is different from the one switch output and that connects with a different one of the plural branches. In this case, also provided are means for supplying an optical monitoring signal to the additional switch input to be directed by the additional connecting means to the different branch for monitoring its operation.

In accordance with a particularly advantageous feature of the present invention, the supplying means includes means for branching off a portion of the optical signal power from the one branch to form the monitoring signal, and means for forwarding the monitoring signal from the branching-off means to the additional switch input. In this context, the supplying means may further include additional switching means that is interposed between the branching-off means of each of the branches and the forwarding means. In that case, the controlling means additionally includes means for operating the additional switching means in unison with the switching means to connect the branching-off means of only the one branch with the additional switch output.

According to another aspect of the present invention, the joining means includes an output switching means interposed between the branches and the main output, and the controlling means further includes means for operating the output switching means in unison with the switching and additional switching means to join solely the one branch with the main output.

Advantageously, each of the branches may include means for amplifying any optical signal passing therethrough to provide all amplified optical signal, in which event the branching-off means is interposed in each of the branches to receive the amplified optical signal from the amplifying means. According to another facet of the invention, the amplifying means is operative for transferring information that is imposed on the incoming signal onto an optical carrier with a predetermined wavelength from such incoming optical carrier onto another optical carrier having a different wavelength than the incoming optical carrier. Under these circumstances, it is advantageous to construct the amplifying means so as to be capable of amplifying optical signals having optical carriers of the predetermined wavelength as well as of the different wavelength.

The novel features which are considered as characteristic of the invention are more particularly set forth in the appended claims. The improved optical transmission system terminal equipment itself, however, both as to its construction and the manner in which it operates, together with additional features and advantages thereof, will be best understood upon perusal of the following detailed description of a specific embodiment with reference to the accompanying drawings.

BRIEF DESCRIPTION OF THE DRAWINGS

In the drawings, wherein similar reference numerals denote like elements throughout the several views.

DETAILED DESCRIPTION OF THE PREFERRED EMBODIMENTS

Figure 1:
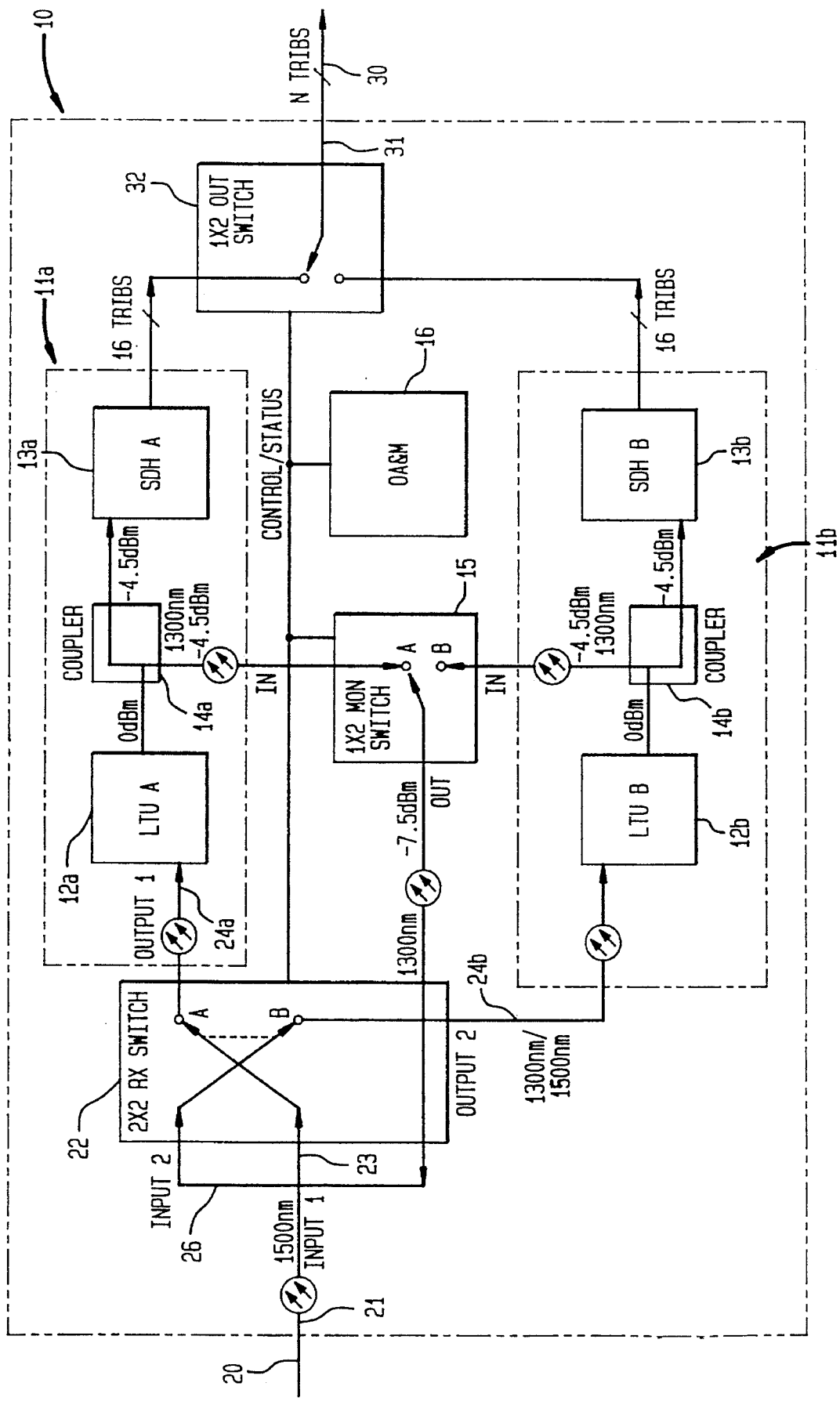
FIG. 1 is a diagrammatic depiction of a terminal transmission equipment arrangement in accordance with the present invention for use at a receiving end of a long-distance optical waveguide transmission medium.

Referring now to the drawings in detail, and initially to FIG. 1 thereof, it may be seen that general reference numeral 10 has been used therein to identify a terminal transmission equipment arrangement embodying the present invention. The arrangement 10, as illustrated, is interposed between a single optical line or transmission medium 20—such as an optical fiber, optical cable, or similar optical waveguide—that carries an incoming optical signal while being used, and an output line or medium 30 adapted to carry outgoing signals leaving the arrangement 10 after having been processed, modified and/or generated therein. In the situation shown, which is typical of the environment in which the present invention is generally intended for use, the optical signal transmission medium 20 is capable of simultaneously carrying many communication channels, either in time-multiplexed or in frequency-multiplexed manner, or both. On the other hand, the output line 30 may contain, as indicated by a slash going though it, a multitude of physically separate "tributaries"—that is, usually electrical transmission lines that separately carry the outgoing signals, typically to different destinations, in a manner that is so well known as to require no further discussion here.

The arrangement 10 has a main input 21 that is connected to the optical line 20, and a main output 31 (which again may include tributary outputs) that is connected with the output line 30. The arrangement 10 further includes many optical, electrical and/or electronic components, all of which will be discussed with a certain degree of particularity below. However, it is appropriate to mention at this juncture that the arrangement 10 is of the redundant equipment type, meaning that some of the aforementioned components are present in it, and are interconnected with each other, in a mutually redundant manner to form separate optical signal processing branches; as shown, there are two branches indicated at 11a and 11b. The yet to be discussed components included in such branches 11a and 11b all have their respective counterparts in the respective other branch 11b or 11a, and the various components included in each of the branches 11a and 11b are interconnected in all identical manner so that the branches 11a and 11b are arranged, so to speak, in a redundant parallel relationship with respect to each other, each of them thus being capable of independently processing any signals passing therethrough in an identical fashion. In view of this, those of the components included in the branches 11a and 11b that constitute respective counterparts of one another will be identified with the same reference numerals but supplemented with the reference character "a" or "b", depending on whether they are included in the branch 11a or in the branch 11b.

As in one type of previously proposed arrangements of this type, each of the branches 11a and 11b includes a line termination unit (LTU) 12a or 12b and a synchronous digital hierarchy (SDH) demultiplexing device 13a or 13b situated downstream of and connected with the output of the unit 12a or 12b. However, unlike in the type of prior art arrangements mentioned above, in the arrangement 10 of FIG. 1 an optical coupler (or splitter) 14a or 14b is interposed between the output of the respective unit 12a or 12b and the input of the associated device 13a or 13b.

Each of the branches 11a and 11b is constructed to perform complete processing of the incoming optical signal arriving to the main input 21 of the arrangement 10 from the optical transmission line 20 to a form required for feeding through the main output 31 into the outgoing line 30. The units 12a and 12b, as well as the devices 13a and 13b, have well known constructions so that they need not be discussed here in detail. Suffice it to say that in the situation depicted in FIG. 1 each of the light termination units 12a and 12b is operative for regenerating and/or conditioning a relatively weak optical signal reaching the same as an electrical signal which is then converted, optionally after some additional processing in the electrical domain such as filtering or the like, back into an outgoing optical signal constituting the output signal of the respective unit 12a or 12b. All LTU that is particularly suited for this purpose is that furnished as AT&T Part No. J68979BA-1. After passing through the respective optical coupler 14a or 14b, a part of the output signal appearing at one of the two outputs of the respective coupler 14a or 14b is supplied to an input of the respective associated synchronous digital hierarchy demultiplexing device 13a or 13b, which preferably is that available as AT&T Part No. 9560 094 12100. The respective device 13a or 13b demultiplexes the respective line rate signal and issues electrical tributary output signals at CEPT4/STM1 customer rates. These electrical output signals of one of the branches (as shown, branch 11a) are then forwarded through another component of the arrangement 10, namely a 1×2 output switch 32 of conventional construction, to the main output 31 and hence to the output line 30.

Figure 2:
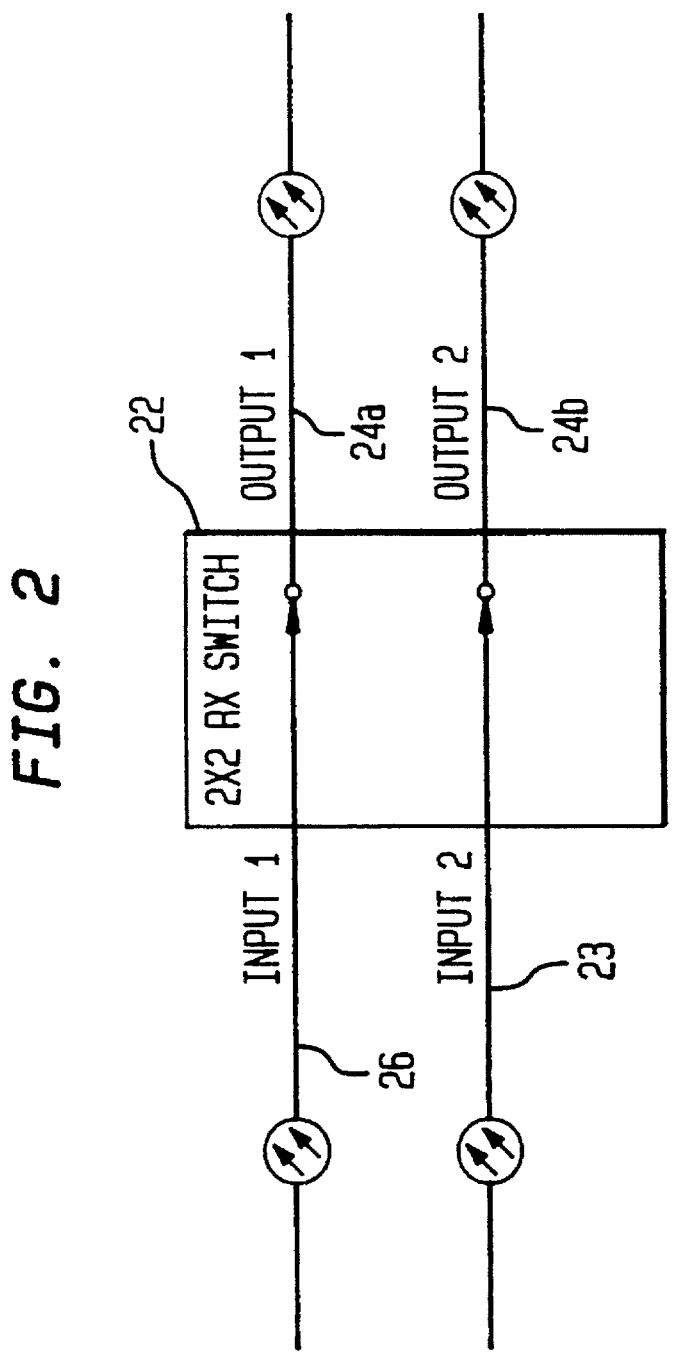
FIG. 2 is a diagrammatic depiction of an optical switch as shown in FIG. 1 in a different one of its switched states.

The arrangement 10 of the present invention includes, instead of the aforementioned optical splitter of the prior art, an input switch 22 that has an input 23 permanently connected with the main input 21 to receive the incoming optical signal therefrom at all times. The input switch 22 further has two outputs 24a and 24b each connected to an input of a different one of the units 12a and 12b. FIG. 1 shows the switch 22 in one of its two possible switching states in which it connects the input 23 with the output 24a. As also depicted in FIG. 1, the switch 22 also has an additional input 26 that is connected with the output 24b in the illustrated, so-called inserted switching state of the switch 22. This may be compared with FIG. 2 which shows the input switch 22 in its other, so-called bypass state in which it connects the input 23 with the output 24b and the other or additional input 26 with the output 24a.

As also illustrated in FIG. 1, the arrangement 10 further includes a 1×2 monitoring switch 15 that has two inputs, each connected to the other of the two outputs of a respective one of the optical couplers 14a and 14b to receive another part of the optical signal issued by the respective unit 12a or 12b. The monitoring switch 15 is operable to alternately assume one of its two switching states—namely that illustrated in FIG. 1 in which it presents at its output the optical output signal part received from the coupler 14a, and the other (not shown) in which its output receives the corresponding optical signal part from the coupler 14b. Such output signal, whatever the position or state of the monitoring switch 15, is then forwarded to the other or additional input 26 of the switch 22. Finally, the arrangement 10 further includes an operation administration and maintenance (OA&M) device 16 which is also of a known construction and the function of which will be discussed shortly. A device supplied as AT&T Part No. J68979AA-1 is particularly well suited for employment in this environment, especially because it is operative not only for determining the health of the system from performance/maintenance information it receives from the various system components, but also for reporting on the system health at a high level, i.e. whether or not any particular failure that may be encountered is transmission threatening.

Having thus described the structure and components of the arrangement 10 in some detail, its operation will now be explained, still primarily with reference to FIG. 1 of the drawings. The arrangement 10 is generally intended for operation in a non-revertive switching mode in which the incoming optical signal processing is conducted in one of the branches 11a and 11b until and unless the OA&M device 16 determines, on the basis of well known criteria indicative of system health, that processing should henceforth take place in the other branch 11b or 11a, in which case an appropriate switching operation to shift processing to the other branch is effected. This switching operation entails substantially simultaneous switching of each of the components 22, 15 and 32, also referred to as switching in unison, from the operating state depicted in FIG. 1 to the other operating state, or vice versa, in response to a switching state control signal issued by the OA&M device 16 to the respective component 22, 15 and 32.

Upon power-up of the arrangement 10, the incoming optical signal is preferably automatically routed through the switch 22 into the branch 11a—that is, initially to the LTU 12a—for processing therein in the manner briefly discussed above. The switches 15 and 32 are in their positions shown in FIG. 1 so that the part of the output signal of the LTU 12a which is not directed by the coupler 14a into the SDH 13a is supplied through the switch 15 to the input 26 of the switch 22 and, from there, into the branch 11b for use in monitoring the performance of the components of the branch 11b.

The signal level at the output of each of the units 12a and 12b is at ≥0 dBm while the sensitivity of the respective device 13a or 13b is approximately at the −30 dBm level, so that the insertion of the respective optical coupler (ordinarily a 50/50 or 3 dB coupler) 14a or 14b, with attendant reduction in the optical power propagating from the unit 12a or 12b to the associated device 13a or 13b (such as by about 4.5 dB including connector losses) due to the presence of the interposed coupler 14a or 14b, is acceptable. Indeed, it may be advisable to intentionally insert additional "loss" between the respective coupler 14a or 14b and the input of the associated SDH 13a or 13b to bring the power of the signal arriving at such input into the dynamic range of the device 13a or 13b.

As previously mentioned, the other part of the optical signal emerging from the other output of the coupler 14a or 14b interposed in the then "active" branch 11a or 11b—i.e. that performing the actual processing of the incoming signal to present the actual outgoing signal—is directed through the monitoring switch 15 to the input 26 of the switch 22 and through the latter into the other, "standby" or monitoring branch 11b or 11a to be processed in the "standby" branch.

The optical signals passing through the switch 22 suffer losses of about 1.5 dB when the switch 22 is in its "inserted" state shown in FIG. 1—that is, when such signals propagate from the input 23 to the output 24a and from the input 26 to the output 24b, respectively. On the other hand, when the switch 22 is in its "bypass" state shown in FIG. 2, the incoming signal arriving at its input 23 still suffers a loss of only about 1.5 dB before reaching the output 24b; yet due to certain structural features of the preferred switch 22, especially the use of a loopback fiber in the path connecting the other switch input 26 with the output 24a when the switch 22 is in its "bypass" state, the monitoring signal (i.e. from the switch 15) is attenuated during its passage through the switch 22 in its "bypass" state to the extent of up to about 6 dB before reaching the switch output 24a. Consequently, the worst case total attenuation in the secondary or monitoring path, which is encountered when the switch 22 is in its "bypass" switching state of FIG. 2 and the switches 15 and 32 are in their corresponding other switched states, is about 13.5 dB. There nevertheless remains sufficient power in the monitoring signal after such attenuation for error-free operation of the equipment in the then "standby" branch 11a.

For a better understanding of the various features and/or of the operation of the arrangement 10, FIG. 1 has been annotated with data indicative of the gains or losses of the various optical signals as they pass though the different components of the arrangement 10. Also provided in FIG. 1 is data indicative of the wavelengths of the optical carriers and, thus, of the frequencies (more specifically the carrier frequency ranges) of the various optical signals. It may be seen that the incoming optical signal is at the 1500 nm level, while the optical signal issued by the respective LTU 12a or 12b is at the level of 1300 nm. Consequently, the SDH devices 13a and 13b are constructed so as to be able to process (amplify) the optical signals in both of these carrier frequency ranges.

While the construction of the preferred switch 22 is such as to have particular utility in the environment described above, that is in the redundant equipment arrangement 10 disposed at the receiving end of the optical signal transmission medium 20, it may just as well be used to advantageously take advantage of its relatively low optical losses in other applications. One currently contemplated utility for such a switch 22 is in an arrangement generally similar to that described above but used in reverse at the transmitting end of a long-haul optical signal transmission medium, for accomplishing a low-loss feeding of the optical signal issued or emerging from one of the parallel processing branches after being processed therein into the transmission medium, to the exclusion of the optical signal from the other branch. Here again, part of the optical output signal could be branched off, in a manner akin to that described above and using corresponding equipment, from the then active branch and routed though the switch 22 into the other branch for monitoring purposes. On the other hand, if it is not desired to use the monitoring feature described above in this alternate context, either the output 26 of the switch 22 would not be used, or the switch 22 may be constructed with only the output 23. The switch 22 will still exhibit the same low optical losses even when used in the opposite (transmitting) direction, so that the overall loss suffered by the optical signal propagating to the output 23 from either of the inputs 24a or 24b will be at the level of about 2 dB, at most, as compared to about a 3 dB loss encountered when using conventional equipment at this location.

While the invention has been illustrated and described as embodied in terminal transmission equipment for use in conjunction with undersea transmission cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the contribution to the art and, therefore, such adaptations should and are intended to be comprehended within the meaning and range of equivalence of the claims.

What is claimed as new and desired to be protected by Letters Patent is set forth in the appended claims.

What is claimed is:

1. An optical line terminal, comprising:

a main input for receiving at least one incoming optical signal;

a main output for issuing at least one outgoing optical signal;

means for processing optical signals in a substantially identical manner in any one of a plurality of mutually redundant receiving and processing circuit branches located within the optical line terminal that extend in parallelism with one another between said main input and said main output;

means for joining at least one of said branches at a time with said main output to provide said outgoing output signal thereto;

optical switching means interposed between said main input and said plural branches of said optical signal processing means and including one switch input connected to said main input for receiving said incoming optical signal therefrom and an additional input, a plurality of switch outputs each connected to an associated one of said branches, connecting means for connecting said one switch input in each of a plurality of switching states of said optical switching means with only one of said switch outputs of said optical switching means to direct all optical power of said incoming optical signal exclusively into said one associated branch connected to said only one switch output, and additional connecting means for connecting said additional switch input in each of said switching states with another of said switch outputs that is different from said one switch output and that is connected to a different one of said branches;

means for supplying to said additional switch input an optical monitoring signal for direction by said additional connecting means to said different branch for monitoring the operation of said different branch; and means for controlling the operation of said optical switching means to selectively switch between said switching states thereof so that the optical signal is directed from said one associated branch to said different one of said branches when a fault is detected in said one associated branch.

2. The optical line terminal as defined in claim 1, wherein said supplying means further comprises means for branching off optical signal power from said one branch to form said optical monitoring signal, and means for forwarding said optical monitoring signal from said branching-off means to said additional switch input.

3. The optical line terminal as defined in claim 2, wherein said branching-off means further comprises means for branching off optical signal power from each said branch to form said optical monitoring signal when said each branch is said one branch; wherein said supplying means further comprises additional switching means interposed between said branching-off means of each said branch and said forwarding means; and wherein said controlling means further comprises means for operating said additional switching means in unison with said switching means to connect said branching-off means of only said one branch with said additional switch output.

4. The optical line terminal as defined in claim 3, wherein said joining means includes an output switching means interposed between said branches and said main output; and wherein said controlling means further comprises means for operating said output switching means in unison with said switching means and said additional switching means to join solely said one branch with said main output.

5. The optical line terminal as defined in claim 2, wherein each of said branches includes means for amplifying any optical signal passing therethrough to provide an amplified optical signal; and wherein said branching-off means is interposed in each of said branches to receive said amplified optical signal from said amplifying means.

6. The optical line terminal as defined in claim 5, wherein said incoming optical signal contains information imposed on an incoming optical carrier having a predetermined wavelength; and wherein said amplifying means further comprises means for transferring said information from said incoming optical carrier to another optical carrier having a different wavelength than said incoming optical carrier and means for amplifying optical signals having optical carriers of said predetermined wavelength and of said different wavelength.

7. An optical line terminal, comprising:

a main input for receiving at least one incoming optical signal;

a main output for issuing at least one outgoing optical signal;

means for processing optical signals in a substantially identical manner in any one of a plurality of mutually redundant receiving and processing circuit branches located within the optical line terminal that extend in parallelism with one another between said main input and said main output;

means for joining at least one of said branches at a time with said main output to provide said outgoing output signal thereto;

optical switching means interposed between said main input and said plural branches of said optical signal processing means and including one switch input connected to said main input for receiving said incoming optical signal therefrom and an additional input, a plurality of switch outputs each connected to an associated one of said branches, connecting means for connecting said one switch input in each of a plurality of switching states of said optical switching means with only one of said switch outputs of said optical switching means to direct all optical power of said incoming optical signal exclusively into said one associated branch connected to said only one switch output, and additional connecting means for connecting said additional switch input in each of said switching states with another of said switch outputs that is different from said one switch output and that is connected to a different one of said branches;

means for supplying to said additional switch input an optical monitoring signal for direction by said additional connecting means to said different branch for monitoring the operation of said different branch, said supplying means comprising means for branching off optical signal power from said one branch to form said optical monitoring signal, and means for forwarding said optical monitoring signal from said branching-off means to said additional switch input, said branching-off means further comprising means for branching off optical signal power from each said branch to form said optical monitoring signal when said each branch is said one branch, said supplying means further comprising additional switching means interposed between said branching-off means of each said branch and said forwarding means; and means for controlling the operation of said optical switching means to selectively switch between said switching states thereof and for operating said additional switching means in unison with said switching means to connect said branching-off means of only said one branch with said additional switch output.

8. The optical line terminal as defined in claim 7, wherein said joining means includes an output switching means interposed between said branches and said main output; and wherein said controlling means further comprises means for operating said output switching means in unison with said switching means and said additional switching means to join solely said one branch with said main output.

9. The optical line terminal as defined in claim 7, wherein each of said branches includes means for amplifying any optical signal passing therethrough to provide an amplified optical signal; and wherein said branching-off means is interposed in each of said branches to receive said amplified optical signal from said amplifying means.

10. The optical line terminal as defined in claim 9, wherein said incoming optical signal contains information imposed on an incoming optical carrier having a predetermined wavelength; and wherein said amplifying means further comprises means for transferring said information from said incoming optical carrier to another optical carrier having a different wavelength than said incoming optical carrier and means for amplifying optical signals having optical carriers of said predetermined wavelength and of said different wavelength.

* * * * *